United States Patent [19]

Arahori et al.

[11] Patent Number: 5,380,511
[45] Date of Patent: Jan. 10, 1995

[54] PROCESS FOR PRODUCING SILICON CARBIDE-BASE COMPLEX

[75] Inventors: Tadahisa Arahori; Shigetoshi Hayashi, both of Chiba; Kazuhiro Minagawa, Kawagoe, all of Japan

[73] Assignee: Sumitomo Metal Industries, Ltd., Osaka, Japan

[21] Appl. No.: 89,615

[22] Filed: Jul. 12, 1993

Related U.S. Application Data

[63] Continuation of Ser. No. 727,211, Jul. 9, 1991, abandoned.

[30] Foreign Application Priority Data

| Jul. 10, 1990 | [JP] | Japan | 2-183641 |
| Sep. 19, 1990 | [JP] | Japan | 2-251222 |
| Sep. 19, 1990 | [JP] | Japan | 2-251223 |
| Sep. 28, 1990 | [JP] | Japan | 2-261599 |
| Oct. 9, 1990 | [JP] | Japan | 2-271669 |
| Feb. 8, 1991 | [JP] | Japan | 3-018091 |

[51] Int. Cl.$^6$ ............................................. C01B 31/36
[52] U.S. Cl. ......................................... 423/345; 501/88
[58] Field of Search .................... 423/344, 345, 439; 156/DIG. 64; 501/88, 154

[56] References Cited

U.S. PATENT DOCUMENTS 4,028,149 6/1977 Deines et al. ........................ 148/175
4,327,066 4/1982 Seiyima ............................... 423/345
4,456,634 6/1984 Galasso et al. ..................... 427/228

FOREIGN PATENT DOCUMENTS 3337949 4/1985 Germany .
61-006109 1/1986 Japan ................................... 423/345
1141812 6/1989 Japan ................................... 423/345

OTHER PUBLICATIONS

Patent Abstracts of Japan, vol. 13, No. 326, Jul. 24, 1989, Kokai–No. 1-103 958.

*Primary Examiner*—Olik Chaudhuri
*Assistant Examiner*—Ken Horton
*Attorney, Agent, or Firm*—Armstrong, Westerman, Hattori, McLeland & Naughton

[57] ABSTRACT

A process for producing silicon carbide-base complex is disclosed. In the process of this invention, a silicon carbide-base complex is produced by means of depositing carbon produced by means of pyrolysis of a gas comprising a hydrocarbon or a hydrocarbon halide on a porous synthesized silica glass body. As a result, the process of manufacture according to the present invention is capable of producing a high purity and a high strength silicon carbide-base material, which is useful as a jig for producing semiconductors, for example, a heat resistance jig material such as a process tube for wafer boats used for heat doping operation.

12 Claims, 2 Drawing Sheets

PROCESS FOR PRODUCING SILICON CARBIDE-BASE COMPLEX

This application is a continuation of application Ser. No. 07/727,211 filed Jul. 9, 1991, now abandoned.

BACKGROUND OF THE INVENTION

1. Field of the Invention

The present invention relates to process for producing silicon carbide-base complex, and more particularly to high purity silicon carbide-base complex which is useful as a jig for producing semiconductors, for example, a heat resistance jig material such as process tube, wafer boat used for heat doping operations, and a process for producing the same. On this occasion, the term "complex" comprehends composites.

2. Description of the Relevant Art

In the past, silica glass has been used as the heat resistance jig for producing semiconductors of the required high purity. The silica glass has several merits, for example, a extremely high purity jig can be produced easily by using it, and its interior can be easily observed because of its transparency.

The silica glass-made jig, however, has also several demerits, for example, it can hardly be used it for heat treatment at a temperature of 1150° C. or more because of it starting to change its dimension at 1000° C. due to viscous flow, and it has a short life because of changing to α-cristobalite causes it to lose transparency an to be broken.

In recent years, a complex produced by charging porous silicon carbide molding molded from a silicon carbide powder with metallic silicon, has been developed as a material which can solves above-mentioned problems instead of silica glass and, has been used as the heat resistance jig for producing semiconductors.

E. G. Acheson has been considered to discover silicon carbide in 1891. The Acheson method, in which silicon carbide is synthesized by means of a carbothermic reduction with silica rock and coke, has been known as a first industrial method for producing silicon carbide. This reaction is shown as the following formula (1):

$$SiO_2 + 3C \rightarrow SiC + 2CO \quad (1)$$

In recent years, in the process of producing semiconductors such as LSI, the use of a heat resistance material mainly composed of silicon carbide for a reactor core tube and a wafer supporting material when silicon wafer is heat-treated in the range of above 1100° C. has increased. On the other hand, the influence of a trace of impurities contained in the reactor core tube and the wafer supporting material has become a problem with high integration of LSI.

In Acheson method described above, the silicon carbide material is produced by means of mixing a silicon source such as quartz sand, crystal powder and colloidal silica with a carbon source such as coke, tar pitch and carbon black, and sintering this mixture. As a result, the silicon carbide material is contaminated by between several ten ppm and several % caused by metallic impurities contained in the silicon source and the carbon source, and also caused by the container, jig, atmosphere in the steps of mixing, molding, sintering, etc.

Further, the silicon carbide-base material is inadequate for a heat resistance material of semiconductor in case of using the contaminated silicon carbide-base material powder, even though the silicon carbide-base material is produced densely by means of a silicon impregnation method without a sintering assistant.

According to severe demands to obtain a high purity silicon carbide material, the process for producing the silicon carbide material powder has been industrialized by means of vapor phase synthesis. The silicon impregnation method, which comprised the steps of sintering the high purity silicon carbide material powder and producing a dense silicon carbide-base material without sintering assistant, has been disclosed in Japanese Patent Laid-Open Publication No. 43553/82.

In the Acheson method as described above, since quartz sand, and crystal powder and colloidal silica are used as the silicon source, and coke, tar pitch and carbon black are used as the carbon source, the silicon carbide material becomes contaminated from several ten ppm to several % by metallic impurities contained in the silicon source and the carbon source, and also by the container, the jig, the atmosphere in the steps of mixing, molding, sintering, etc. Therefore, it is difficult to synthesize a high purity silicon carbide-base material.

In addition, a method comprising the step of heating metallic silicon at a temperature at its melting point or more and impregnating the melted silicon has been used generally (Japanese Patent Laid-Open Publication Nos. 85374/76, 14914/89, 115888/89). Also, a method comprising the steps of evaporating silicon by means of induction heating of graphite molding and impregnating silicon into the silicon carbide body has been disclosed (Japanese Patent Laid-Open Publication No. 43553/82).

A method comprising the step of producing a dense silicon carbide membrane on the surface of silicon carbide material by means of vapor deposition of silicon carbide, the membrane inhibiting impurity diffusion, has been disclosed.

The silicon carbide-base material being used for producing semiconductors, has been produced by means of a purifying treatment after molding and sintering. However, not only is the material contaminated during the steps of these complex process for producing it, but it also removes impurities from only the surface because the purifying treatment is performed after sintering. As a result, in case that the silicon wafer is heat-treated with the silicon carbide-base material-made jig produced by the above-mentioned method, the jig may contaminate the silicon wafer because of diffusional release of impurities such as Fe in the material composed of silicon carbide.

Also, according to a method comprising the step of impregnating a silicon carbide body with molten or melted metallic silicon, large amount of energy is required to raise the temperature to above 2000° C. and thermal deformation and cracks may be induced into the silicon carbide body by thermal shock.

According to the method which comprises producing the dense silicon carbide membrane on the surface of the silicon carbide material by means of vapor deposition of silicon carbide, and in which the membrane inhibits impurities diffusion, the silicon carbide-base material, produced by means of the above-mentioned method, induces pin-holes on its surface and cracks by mechanical or thermal shock because of a low adhering strength of the membrane.

Moreover, the silicon carbide-base material becomes from the container, the jig, and the atmosphere in the steps of storage of the silicon carbide material powder, molding the silicon carbide powder, or sintering this molding, even though the synthesized high purity silicon carbide material powder produced by means of vapor phase synthesis is used. Therefore, it is difficult to produce the extremely high purity silicon carbide-base complex for producing a semiconductor.

Only in the case of forming a dense silicon carbide thick film directly on a high purity graphite molding or a high purity silica glass-made molding, is it possible to produce a high purity silicon carbide-base complex. However, according to the above-mentioned method, it still has problems to be solved because of slow growth reaction of the silicon carbide, the expense for producing, and breaking the silicon carbide-base material due to a difference of thermal expansion coefficient between silicon carbide and graphite and silica glass as base material.

The silicon carbide powders being used for heat resistant ceramic materials have a high purity and a high degree of sintering, and have been required to be supplied as fine particles. In addition, the silicon carbide materials being used for a jig for producing semiconductors have been required to have a high purity and not to contaminate the silicon wafers.

In the past, a silicon carbide powder has been produced by a method which comprises crushing $\alpha$-type silicon carbide produced by means of the Acheson method, and then passing it through a sieve (Japanese Patent Laid-Open Publication No. 84013/78).

In order to obtain a dense sintered molding using the silicon carbide powder produced by above-mentioned method, the sintering temperature required is an extremely high temperature, because the silicon carbide powder produced by above-mentioned method is $\alpha$-type silicon carbide which stabilizes under high temperature, and does not accompany transformation and dislocation of crystal-type at sintering, and its sintering speed is slow. Also, this silicon carbide powder cannot be used for producing semiconductors because of some contaminant caused by the step of crushing and by material such as quartz sand and coke. In addition, the impurities which the silicon carbide powder includes causes breaking as well as a strength scattering of the sintered molding.

Contrarily, a method, in which $\beta$-type silicon carbide particles are produced by means of vapor phase reaction with silicon halide, silicon carbide, etc., has been disclosed in Japanese Patent Laid-Open Publication No. 160200/75. Moreover a method in which a high purity $\beta$-type silicon carbide is produced by means of pyrolysis of an organic silicon compound, has been disclosed in Japanese Patent Laid-Open Publication No, 67599/79.

However, according to the former of the above-mentioned methods, there is the possibility of contaminating the silicon carbide particles with metal halide gas which is formed in the step that hydrohalide gas corrodes tube because corrosive hydrohalide gas exists as by-product in this reaction system.

In addition, according to the latter of the above-mentioned methods, it is required to remove free carbon by means of sintering under an oxidizing atmosphere because of remaining free carbon in vapor phase as kinds of organic silicon compound, or as a condition of pyrolysis.

Further, because it is required to separate and recover the silicon carbide powder deposited from the vapor phase, the silicon carbide powder causes lowering of the yield and contamination.

SUMMARY OF THE INVENTION

While the present invention is based on the above description, a brief summary will be set forth.

The invention is a process for producing a silicon carbide-base complex, comprising the steps of conducting pyrolysis of a gas comprising a hydrocarbon having 1-6 carbon atoms or a hydrocarbon halide having 1-6 carbon atoms to produce carbon and depositing said carbon in a porous synthesized silica glass molded body.

The invention is a process for producing a silicon dioxide-carbon complex, comprising the step of conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 3 or more.

The invention is a process wherein pyrolysis temperature is from decomposition temperature of the hydrocarbon or the hydrocarbon halide gas to 1400° C.

The invention is a process comprising the step of heat-treating the silicon carbide-base complex at a temperature of from 1600° C. to 2500° C.

The invention is a process for producing a silicon carbide-base complex, comprising the steps of conducting pyrolysis of a gas comprising a hydrocarbon having 1-6 carbon atoms or a hydrocarbon halide having 1-6 carbon atoms to produce carbon and depositing said carbon in a porous synthesized silica glass body, heat-treating the same to obtain a porous molding, and charging pores of said molding with metallic silicon.

The invention is a process wherein the mole ratio of carbon deposited in the porous synthesized silica glass body to silicon dioxide is 3 or more.

The invention is a process wherein the process further comprises the step of reacting excess carbon existing in the porous molding with a charge of metallic silicon.

The invention is a process wherein the step of charging pores of the porous molding with metallic silicon is achieved by means of infiltration with molten silicon.

The invention is a process wherein the step of charging pores of the porous molding with metallic silicon is achieved by means of infiltration with molten silicon.

The invention is a process wherein the step of charging pores of the porous molding with metallic silicon is achieved by means of pyrolysis of a gas including silicon.

The invention is a process wherein the step of charging pores of the porous molding with metallic silicon is achieved by means of pyrolysis of a gas including silicon.

The invention is a process for producing a silicon carbide tube, comprising the steps of forming a porous body of silica glass by means of vapor phase synthesis on a surface of tubular material, conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 3 or more, and heat-treating the body to produce a silicon carbide tube.

The invention is a process wherein the heat-treating is conducted at a temperature from 1600° C. to 2500° C.

The invention is a process wherein the process further comprises the step of charging the porous silicon carbide tube with metallic silicon.

The invention is a process for producing a silicon carbide-base complex, comprising the steps of joining a first synthesized silica glass porous body at a joining plane to a second synthesized silica glass porous body to produce a joined body, conducting pyrolysis of a gas comprising a hydrocarbon having 1-6 carbon atoms or a hydrocarbon halide having 1-6 carbon atoms so as to produce carbon and depositing said carbon on a porous synthesized silica glass joined body in a mole ratio of carbon to silicon dioxide of 3.5 or more, heat-treating the joined body to produce a silicon carbide molding, and charging said porous silicon carbide molding with metallic silicon.

The invention is a process for producing a silicon carbide-base complex, comprising the steps of conducting pyrolysis of a gas comprising a hydrocarbon having 1-6 carbon atoms or a hydrocarbon halide having 1-6 carbon atoms so as to produce carbon and depositing said carbon in a porous synthesized silica glass bodies in a mole ratio of carbon to silicon dioxide of 3.5 or more to obtain a porous silicon dioxide-carbon molding, joining said porous molding at a joining plane to a second porous silicon dioxide-carbon molding to produce a jointed molding, heat-treating the joined molding to obtain a silicon carbide molding, and charging said porous silicon carbide molding with metallic silicon.

The invention is a process for producing a silicon carbide-base complex, comprising the steps of conducting pyrolysis of a gas comprising a hydrocarbon having 1-6 carbon atoms or a hydrocarbon halide having 1-6 carbon atoms so as to produce carbon and depositing said carbon in a porous synthesized silica glass body in a mole ratio of carbon to silicon dioxide of 3.5 or more, heat-treating the body to obtain a porous silicon carbide molding, joining said porous silicon carbide molding at a joining plane to a second porous silicon carbide molding to produce a joined molding, and charging the joined molding with metallic silicon.

The invention is a process for producing a silicon dioxide-carbon complex, comprising the steps of conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 1 or less to obtain a porous silicon dioxide-carbon complex, and making the complex dense by heat-treating at a temperature of from 1200° C. to 1600° C.

This invention is a process for producing a silicon dioxide-silicon carbide complex, comprising the steps of conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 1 or less to obtain a porous silicon dioxide-carbon complex, and generating silicon carbide in said complex by heat treatment of the complex at a temperature of from 1600° C. to 2000° C.

This invention is a process for producing a silicon dioxide-silicon carbide complex tube, comprising the steps of forming a porous body of silica glass by vapor phase synthesis on a surface of tubular material, conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 1 or less, and heat-treating the body at a temperature of from 1600° C. to 2000° C.

This invention is a process for producing a silicon carbide powder, comprising the steps of conducting pyrolysis of a gas comprising a hydrocarbon having 1-6 carbon atoms or a hydrocarbon halide having 1-6 carbon atoms so as to produce carbon and depositing said carbon in a porous synthesized silica glass molded body in a mole ratio of carbon to silicon dioxide of 1 to 3, and heat-treating the body at a temperature of from 1600° C. to 2500° C.

This invention is a process for producing a silicon carbide tube, comprising the steps of forming a porous body of silica glass by means of vapor phase synthesis on a surface of tubular material, conducting pyrolysis of a gas comprising a hydrocarbon having 1-6 carbon atoms or a hydrocarbon halide having 1-6 carbon atoms so as to produce carbon and depositing said carbon in a porous synthesized silica glass body in a mole ratio of carbon to silicon dioxide of 3 or more, heat-treating the body to produce a silicon carbide tube, and charging the porous silicon carbide tube with metallic silicon.

This invention is a process wherein the heat-treating is conducted at a temperature from 1600° C. to 2500° C.

It is, therefore, an object of this invention to provide a process for producing a silicon carbide-base complex which is useful as a material for producing a semiconductor jig which does not deform under high temperature, which has a high purity, and does not contaminate the wafer during the doping operation of the silicon wafer.

It is another object of this invention to provide a process for producing a high purity silicon dioxide-carbon complex produced from a silicon source of a high purity porous synthesized silica glass body.

It is a further object of the present invention to provide a process for producing a silicon carbide tube, which is useful as a high purity material for producing a semiconductor with a simple process and at a low cost, and which is produced from a extremely high purity porous synthesized silica glass body deposited on the inside and on the outside surface of a high purity graphite pipe or silica glass-made pipe as silicon a source.

It is an additional object of the present invention to provide a process for producing a jointed silicon carbide molding which has a high purity, complex configuration and large-size, and which can be used for producing semiconductors.

It is a further object of the present invention to provide a process for producing a dense silicon dioxide-carbon complex and a dense silicon dioxide-silicon carbide complex which can be used as a high purity heat resistance material, at a relatively low cost in the steps of producing semiconductor.

It is another object of this invention to provide a process for producing a high purity silicon carbide powder which can be produced easily and in a good yield, and which is useful for a heat resistance ceramic molding material.

There and other objects of the invention will be readily understood from the following description, taken in connection with the accompanying drawings.

DETAILED DESCRIPTION OF THE INVENTION

Figure 1:
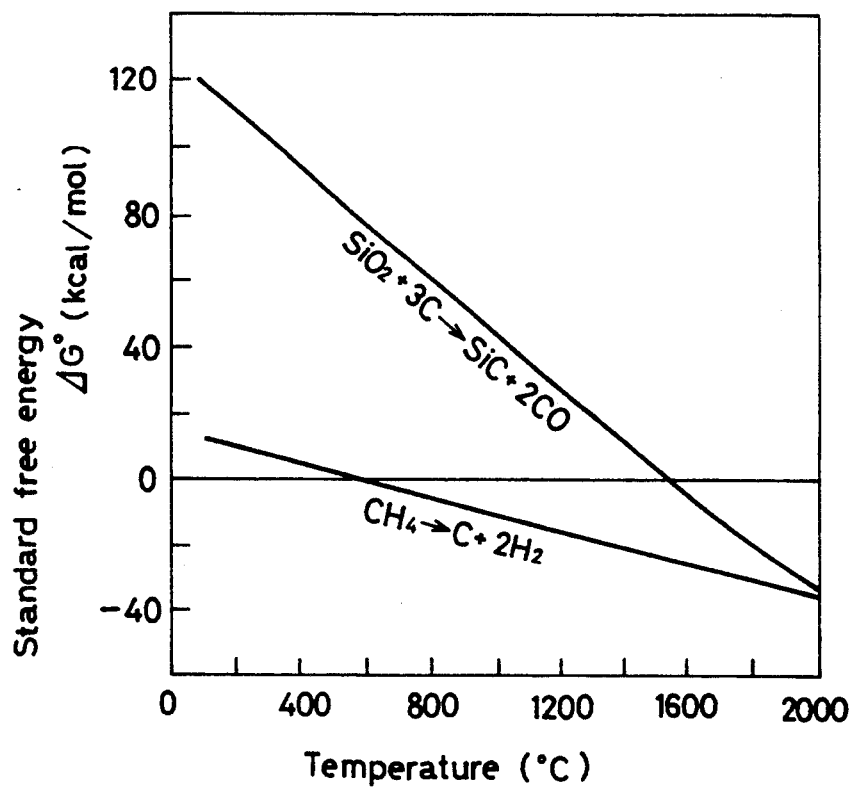
FIG. 1 is a graph showing calculated results of standard free energy in a reaction of formula (1).

Initially, we refer now to a process for producing a silicon dioxide-carbon complex and a silicon carbide complex.

A vapor phase synthesis technique named generically the Soot method which includes MCVD (Modified Chemical Vapor Deposition) method, OVD (Outside Vapor Deposition) method, VAD (Vapor-phase Axial Deposition) method etc. has been developed, and made practicable in order to produce optical fiber as a method for producing a extremely high purity synthesized silica glass. According to this method, the synthesized silica glass has been known to include only 1 ppm or less of elemental metallic impurities.

A process for producing a porous silica glass body produced by means of vapor phase synthesis comprises the steps of:

vaporizing silicon chloride such as silicon tetrachloride, hydrolysis by the following formula (2) under an oxidizing atmosphere such by in a flame, or oxidizing as the following formula (3), to obtain a silicon dioxide particle, sedimentation of the silicon dioxide particle,

$$SiCl_4 + 2H_2O \rightarrow SiO_2 + 4HCl \qquad (2)$$

$$SiCl_4 + O_2 \rightarrow SiO_2 + 2Cl \qquad (3)$$

There are other methods for producing the porous silica glass body which are as follows:

1. Sol-Gel Method:
   This method is referred to as hydrolysis of an alkoxy silane such as TEOS (tetraethoxy silane: Si(OC$_2$H$_5$)$_4$), and the porous silica glass body is produced by drying the reaction products after reaction in liquid phase, but the purity is lower than by the VAD method.

2. Phase splitting method:
   This method comprises the steps of heat-treating borosilicate glass, phase-separating into B$_2$O$_3$ glass and SiO$_2$ glass, and eluting only B$_2$O$_3$ by acid. According to this method, a porous silicon dioxide glass, called vycorglass, can be obtained in 96% purity.

The porous synthesized silica glass body produced by means of above the vapor phase synthesis can avoid being contaminated by metallic impurities which are formed by corrosion of reactor, because halogen gas such as HCl and Cl$_2$, are separated from the particle at the step of sedimentation of the silicon dioxide particle, and thus the particles have extremely high purity.

Then, 100 μm or less is favorable for the particle diameter of the porous silica glass body in this step. Because the desired silicon dioxide-carbon complex or silicon carbide is not obtained, even though particles having more than 100 μm diameter are covered by carbon by means of deposition. In case of using a extremely high purity porous synthesized silicon dioxide as a silicon carbide in the vapor phase synthesis according to formula (1), a silicon dioxide-carbon complex, which is similar to microscopic mixture of silicon dioxide and carbon, is obtained by the steps of heat-treating the porous silicon dioxide under an atmosphere comprising hydrocarbon gas or hydrocarbon halide gas, and depositing carbon homogeneously over inside of the porous silicon dioxide. Moreover, a high purity porous silicon carbide can be obtained by heat-treating the silicon dioxide-carbon complex.

The hydrocarbon gas is, for example, such as CH$_4$, C$_2$H$_6$, C$_3$H$_8$, C$_4$H$_{10}$, C$_2$H$_4$, C$_2$H$_2$, C$_6$H$_6$, and the hydrocarbon halide gas is such as CH$_3$Cl, CH$_2$Cl$_2$, CHCl$_3$, C$_2$H$_4$Cl$_2$, C$_2$H$_3$Cl$_3$, C$_2$H$_3$Cl, C$_2$H$_2$Cl$_2$, C$_2$HCl$_3$, C$_6$H$_5$Cl. carbon is not deposited at the decomposition temperature or less of the hydrocarbon gas or hydrocarbon halide gas, and cannot be deposited over the inside of the porous synthesized silica glass body at a temperature of 1400° C. or more because of the body becoming dense. Therefore, it is necessary to regulate the temperature for depositing carbon from the decomposition temperature of the hydrocarbon gas or the hydrocarbon halide gas to 1400° C. In addition, silicon carbide having the stoichiometric ratio and a silicon carbide complex having excess carbon are obtained by control of the carbon deposition. The mole ratio of carbon to silicon dioxide is preferably 3 or more to obtain a silicon carbide molding after heat-treating.

The heat-treating temperature to obtain silicon carbide from the silicon dioxide-carbon complex, as the result of thermodynamic calculation illustrated in FIG. 1, is about 1600° C. or more, at which the standard free energy (ΔG) becomes a negative value in formula (1). In addition, since a heating system which actually achieves a heat-treating temperature of more than 2500° C. is impractical, the heat-treating temperature to produce the silicon carbide is preferably from 1600° C. to 2500° C. As a result, it is possible to control the porosity of the porous silicon carbide synthesized by means of the above method, according to the control of the porosity of the porous synthesized silica glass body by means of heat treatment.

Moreover, a high purity silicon carbide powder can be obtained by milling the porous silicon carbide.

According to the above method, a extremely high purity porous silicon carbide is produced by the steps of heat-treating a high purity porous synthesized silica glass body under an atmosphere comprising hydrocarbon gas or hydrocarbon halide gas, depositing carbon homogeneously over the inside of the porous body to obtain a silicon dioxide-carbon complex, and heat-treating the same, in the case of a high purity starting material, the steps being conducted without mixing and molding.

Thus, we refer to a process for producing a silicon carbide material according to this method. It is necessary to use a high purity porous synthesized silica glass body which is composed of silicon dioxide particles having an average particle diameter in the range of 0.01~10 μm, has 40~80% porosity, and contains 1 ppm or less of impurities. Such a body is not contaminated because this porous synthesized silica glass body is produced without the steps of mixing with binder and molding such as pressing. In addition the body is molded into the configuration of the final product and used as a starting material for this method.

Further, according to this invention, A carbon having a particle diameter of several ten nm is deposited on the surface of the porous synthesized silica glass body inside composed of silicon dioxide particles, by means of heat-treating under an atmosphere of hydrocarbon gas or hydrocarbon halide gas, for example, comprising at least one gas among $CH_4$, $C_2H_6$, $C_3H_8$, $C_4H_{10}$, $C_2H_4$, $C_2H_2$, $C_6H_6$, $CH_3Cl$, $CH_2Cl_2$, $CHCl_3$, $C_2H_4Cl_2$, $C_2H_3Cl_3$, $C_2H_3Cl$, $C_2H_2Cl_2$, etc., at a temperature from decomposition temperature of the hydrocarbon gas or hydrocarbon halide gas used to 1400° C. If this temperature is less than the decomposition temperature of the hydrocarbon or hydrocarbon halide gas used, the carbon cannot be deposited, and if this temperature is 1400° C. or more, the carbon cannot be deposited over the inside because it becomes dense at a temperature of 1400° C. or more.

In addition, the mole ratio of carbon to silicon dioxide of 3 or more is necessary relative to silicon dioxide comprised in base material, the porous synthesized silica glass body. The reaction of silicon dioxide with carbon proceeds by the following reaction:

$$SiO_2 + 3C \rightarrow SiC + 2CO \qquad (1)$$

Therefore, a carbon deposition with a mole ratio of carbon to silicon dioxide of less than 3 causes the porous body to be lowered in strength, be powdered and be broken, because of the remaining excess silicon dioxide, and the silicon dioxide vaporized during at heat treatment.

On the other hand, in the case of remaining excess carbon in the porous silicon carbide material, the excess carbon reacts with metallic silicon easily by impregnation with metallic silicon, and thereby becomes silicon carbide.

In next step, the synthesized silica glass-carbon complex is heat-treated at a temperature from 1600° to 2500° C. under a non-oxidizing atmosphere, for example, an atmosphere comprising at least one gas among helium, neon, argon, hydrogen, etc., or under a vacuum, so that a particle of silicon dioxide is reduced extremely rapidly by a super fine particle of pyrolytic carbon and completely becomes silicon carbide. In this step, if the heat-treating temperature is lower than 1600° C., the silicon dioxide does not react with the carbon, and a heating system which can raise the temperature to more than 2500° C. is impractical in factories. Therefore, heat-treating temperature is preferably from 1600° C. to 2500° C.

In next step, the porous molding caused to become dense by means of impregnating this porous molding with molten metallic silicon. Then, it is preferable to keep a condition of reduced pressure in reactor, in order that the molding is impregnated rapidly with molten silicon. Also, it is necessary to maintain the temperature in the reactor from the melting point to uneasy point of evaporation of metallic silicon.

Instead of the impregnation in the above-mentioned step, pyrolysis may be adopted. Namely, the porous compact may be caused to become dense by means of heat-treating under an atmosphere comprising silicon, for example, at least one gas among $SiCl_4$, $SiHCl_3$, $SiH_4$, etc., at temperature from the decomposition temperature of the gas used to 2000° C., thereby depositing metallic silicon on the porous molding. Then, hydrogen, argon, etc. may be used for carrier gas. If this pyrolysis temperature is less than the decomposition temperature of the gas used, metallic silicon does not deposit. If this pyrolysis temperature is more than 2000° C., the pyrolysis requires large amounts of energy and causes heterogeneous deposition on the surface of porous molding. Therefore, heat treatment temperature for pyrolysis temperature is more preferable from 600° C. to 1200° C. according to the used gas.

In both of the above-mentioned steps, in other words, in the steps of impregnating and pyrolysis, since the excess carbon exists in the porous molding in the form of a fine particles of several ten nm diameter, the excess carbon reacts easily with the melting silicon, the gas comprising silicon or deposited metallic silicon. As a result, the strength of the silicon carbide material is improved.

With synthesized silica glass produced by means of vapor phase synthesis such as the Soot method, carbon can be deposited on the inside its porous body by heat treatment under an atmosphere comprising carbon source gas because of porousness, and the body has extremely high purity with only 1 ppm or less of total metallic impurities.

In case that the carbon is deposited on a porous synthesized silica glass body with the mole ratio of carbon to silicon dioxide of 3 or more, the silicon dioxide does not remain in the porous body, thereby avoiding vaporization of silicon dioxide gas during heat treatment. Therefore, breaking of the porous body, lowering the strength and powdering are not likely to occur.

Moreover, a extremely high purity porous silicon carbide molding and porous silicon carbide-carbon molding are obtained by heat-treating the silicon dioxide carbon complex produced by means of above-mentioned heat-treating.

In the next step, a dense silicon carbide material is produced easily by means of heating the porous molding at a temperature at the melting point of metallic silicon or more, and allowing molten silicon to react with the porous molding by dipping under a vacuum. As a result the porosity becomes almost zero.

Instead of using molten silicon in the above-mentioned step, pyrolysis may be adopted. Namely, the porous molding be densified by means of heat treating under an atmosphere comprising silicon, and depositing metallic silicon on the porous molding. Then, if there is excess carbon in the porous molding, the carbon reacts rapidly with metallic silicon to become silicon carbide. As a result, its strength of the silicon carbide material improves. According to the above-mentioned methods, it is possible to omit the essential steps in the previous methods, such as milling material and mixing, molding so as to avoid contamination from these steps, and to obtain a extremely high purity silicon carbide material.

Then, we refer to a process for producing a silicon carbide tube and a silicon dioxide-silicon carbide complex tube.

As previously described, a vapor phase synthesis technique named generically the Soot method which includes MCVD (Modified Chemical Vapor Deposition) method, OVD (Outside Vapor Deposition) method, VAD (Vapor-phase Axial Deposition) method etc. has been developed, and made practicable to produce optical fiber.

The OVD method comprises the step of depositing a synthesized silica glass particle on the outside of starting material such as tube material or stick material, and the MCVD method comprises the step of depositing a synthesized silica glass particle on the inside of starting material such as tube material, thereby efficiently producing a cylindrical porous synthesized silica glass base material. According to the OVD method or the MCVD method, it is possible to produce a high purity silicon carbide-base material because contamination from handling in the step of molding is avoided since the silicon carbide material is made from a silicon source such as silicon dioxide directly without molding step. It is preferable to use a high purity silica glass-made pipe, graphite pipe, etc. as a starting tubular substrate.

A porous silica glass body synthesized by means of vapor phase synthesis comprises the steps of:
vaporizing silicon chloride such as silicon tetrachloride,
conducting hydrolysis as shown by the following formula (2) under an oxidizing atmosphere such as in a flame, or oxidizing as shown by the following formula (3) to obtain a silicon dioxide particle,
sedimentating the silicon dioxide particle.

$$SiCl_4 + 2H_2O \rightarrow SiO_2 + 4HCl \qquad (2)$$

$$SiCl_4 + O_2 \rightarrow SiO_2 + 2Cl_2 \qquad (3)$$

The porous synthesized silica glass body produced by means of the above vapor phase synthesis can avoid being contaminated by metallic compounds, which are formed by corrosion of reactor, because of halogen gas such as HCl, $Cl_2$ is separated from the particle during the step of sedimentation of the silicon dioxide particle, and the body has extremely high purity.

As the result of our research, in consideration of the fact that carbon is deposited homogeneously in the porous synthesized silica glass body by means of heat treating the porous synthesized silica glass body under an atmosphere comprising high purity hydrocarbon gas or hydrocarbon halide gas, we have found that an extremely high purity porous silicon carbide pipe can be synthesized by means of heat-treating pipe-shaped silicon dioxide-carbon complex obtained by the above-mentioned heat treatment, by using a high purity starting material, and without the steps of mixing and molding.

Also, we have found that a dense silicon carbide pipe is produced easily by means of heat treating a porous silicon carbide pipe up to the melting point of silicon, allowing the pipe to react with molten silicon by dipping under reduced pressure and heat-treating, or by means of heat treating under an atmosphere comprising at least one gas such as $SiCl_4$, $SiHCl_3$, $SiH_4$ a temperature of from the decomposition temperature of the gas used to 2000° C.

In the case of using the extremely high purity porous pipe-shaped silica glass body as a silicon dioxide in the vapor phase synthesis as shown in formula (1), a silicon dioxide-carbon complex, which is similar to a microscopic mixture of silicon dioxide and carbon, is obtained by the steps of heat-treating the porous pipe-shaped body under an atmosphere comprising a hydrocarbon gas or a hydrocarbon halide gas, and depositing carbon homogeneously over the inside of the porous body. Moreover, a high purity porous silicon carbide pipe can be obtained by heat-treating the pipe-shaped complex.

The hydrocarbon gas is, for example, a gas such as $CH_4$, $C_2H_6$, $C_3H_8$, $C_4C_{10}$, $C_2H_4$, $C_2H_2$, $C_6H_6$, and the hydrocarbon halide gas is such as $CH_3Cl$, $CH_2Cl_2$, $CHCl_3$, $C_2H_4Cl_2$, $C_2H_3Cl_3$, $C_2H_3Cl$, $C_2H_2Cl_2$, $C_2HCl_3$, $C_6H_5Cl$. Carbon is not deposited at less than the decomposition temperature of the hydrocarbon gas or the hydrocarbon halide gas, and cannot be deposited over the inside of the porous synthesized silica glass body at a temperature of 1400° C. or more because of the body becoming dense. Therefore, it is necessary to regulate the temperature for the deposition of carbon between the decomposition temperature of the hydrocarbon gas or the hydrocarbon halide gas to 1400° C. In addition, a silicon dioxide-carbon complex having various mole ratios of carbon to silicon dioxide is obtained by means of control of the carbon depositing conditions.

The heat-treating temperature to obtain silicon carbide from the silicon dioxide-carbon complex, as the result of thermodynamic calculation illustrated in FIG. 1, is about 1600° C. or more, at which the standard free energy ($\Delta G$) becomes a negative value in formula (1). In addition, since a heating system which actually achieves a heat-treating temperature above 2500° C. is impractical, the heat-treating temperature to produce silicon carbide is preferably from 1600° C. to 2500° C.

Since the silicon carbide produced by the above method is difficult to sinter, and does not become dense such as silica glass, it is impossible to keep a porous configuration without excess carbon. Therefore, it is necessary to supply a mole ratio of carbon to silicon dioxide of 3 or more to obtain the porous silicon carbide pipe.

Then, if the heat-treating temperature is more than 2000° C., the synthesized silica glass used for the base material can allowed to vaporize as silicon oxide.

In a above-mentioned method, the synthesized silica glass base material can be also dissipated by hydrogen fluoride, and a graphite substrate can be also dissipated by means of heating under an oxidizing atmosphere.

Also, it is possible to control the porosity of the porous silicon carbide synthesized by means of temperature control of sedimentation plane, or to control the porosity of the porous synthesized silica glass body by heat treatment.

In the last step, a dense silicon carbide pipe can be obtained by means of impregnation with molten high purity silicon. Then, it is preferred to maintain a reduced pressure in the reactor in order to rapidly infiltrate the molten silicon to the inside of the porous body, and also to maintain a temperature in the reactor from the melting point of silicon to the uneasy point of evaporation of silicon.

The excess carbon and silicon composing the porous body react and become silicon carbide by means of infiltrating molten silicon into the inside of the porous silicon carbide pipe body, as the following formula (4):

$$Si + C \rightarrow SiC \qquad (4)$$

Instead of impregnating as in the above-mentioned step, pyrolysis may be adopted. Namely, the heat-treated pipe can be densified by means of heat-treating under an atmosphere comprising a silicon source gas, for example, at least one gas among $SiCl_4$, $SiHCl_3$, $SiH_4$, etc., at a temperature of from the decomposition temperature of the gas used to 2000° C., to thereby deposit metallic silicon over the inside of the porous silicon carbide pipe. Then, hydrogen, argon, etc. may be used for carrier gas. If this heat-treating temperature is at the decomposition temperature of the gas used or less, metallic silicon does not deposit. If heat-treating temperature is more than 2000° C., the step require large amount of energy and causes heterogeneous deposition to the surface. Therefore, the heat-treating temperature is more preferably from 600° C. to 1200° C. according to gas used.

In both of the above-mentioned steps, since the excess carbon which exists in the silicon carbide pipe is in the form of extremely fine particles of several ten nm diameter, the excess carbon reacts easily with the melting silicon, the gas comprising silicon or deposited metallic silicon, and thereby becomes silicon carbide. As a result, the strength of the silicon carbide material is improved.

Further, when the mole ratio of carbon to silicon dioxide of pipe-shaped silicon dioxide-carbon complex is 1 or less, and the heat-treating temperature is from 1600° C. to 2000° C., the reaction, as described above in formula (4), proceeds and heat-treating is promoted by viscous flow of excess silica glass, and, as a consequence the dense pipe-shaped silicon dioxide-silicon carbide complex is obtained. If the mole ratio of carbon to silicon dioxide is from 1 to 3, it is impossible to keep the porous configuration because the deposited carbon inhibits viscous flow of the silica glass. Consequently, the pipe-shaped silicon dioxide-carbon complex does not become dense, and silicon carbide powder is formed. Therefore, it is necessary to keep the mole ratio of carbon to silicon dioxide at 1 or less to obtain a dense pipe-shaped silicon dioxide-silicon carbide complex, and it is also necessary to keep the heat-treating temperature at less than 2000° C., at which the silica glass starts vaporizing.

According to the above-mentioned method, an extremely high purity porous silicon carbide pipe is produced by the steps of heat-treating a high purity pipe-shaped porous synthesized silica glass body under an atmosphere comprising hydrocarbon gas or hydrocarbon halide gas, depositing carbon homogeneously over the inside of the pipe-shaped porous synthesized silica glass body so that the mole ratio of carbon to silicon dioxide is 3 or more, and heat-treating the same at a temperature of from 1600° C. to 2500° C., in the case of a high purity starting material, the steps being conducted without mixing and molding.

Further, a dense silicon carbide pipe is produced easily by means of heating a porous silicon carbide pipe as above-mentioned with a high purity silicon up to the melting point of silicon under reduced pressure, and allowing molten silicon to infiltrate into the inside of the porous body.

Instead of the above-mentioned impregnation by molten silicon, pyrolysis may be adopted. Namely, the porous silicon carbide pipe is densified by means of heat treating under an atmosphere comprising silicon gas at a temperature from the decomposition temperature of the gas used to 2000° C., to thereby deposit metallic silicon in the porous molding.

Still further, the extremely high purity and dense pipe-shaped silicon dioxide-silicon carbide complex is obtained, by similar reason as above-mentioned, when the pipe-shaped silicon dioxide-carbon complex having a mole ratio of carbon to silicon dioxide of 1 or less is heat-treated at a temperature of from 1600° C. to 2000° C.

Then, we refer to a process for producing a jointed silicon carbide molding where a synthesized silica glass produced by means of vapor phase synthesis such as the Soot method has carbon deposited over its porous body by heat treatment under an atmosphere comprising carbon source gas. Thereafter, a high purity dense silicon carbide material is produced by means of heat-treating the porous body having deposited carbon, and then impregnating with metallic silicon.

However, since it is difficult to process the porous synthesized silica glass base material into large-sized and complex products, it is necessary to join processed synthesized silica glass base materials.

According to this invention, in order to produce large-sized and complex products by means of joining, the steps are used which comprise of joining processed synthesized silica glass porous bodies produced by vapor phase synthesis at a joining the plane join, heat-treating the joined bodies under an atmosphere comprising at least one of a hydrocarbon gas or hydrocarbon halide gas such as $CH_4$, $C_2H_6$, $C_3H_8$, $C_4H_{10}$, $C_2H_4$, $C_2H_2$, $C_2H_4Cl_4$, $C_2H_3Cl_3$, $C_2H_3Cl$, $C_2H_2Cl_2$, etc., at a temperature from the decomposition temperature of the gas used to 1400° C., and depositing carbon in the porous body. Then, the silicon carbide is produced as showing formula (1). Therefore, it is necessary to deposit carbon so as to have the mole ratio of carbon to silicon dioxide be 3, actually carbon is deposited so as the mole ratio of 3.5 due to joining silicon carbide after depositing excess carbon at the joining plane. In case that the mole ratio is 3.5 or less, the junction strength at a high temperature becomes insufficient because the junction at the plane becomes mainly a silicon junction.

In next step, the porous silicon carbide molding joined at the joining plane, which comprises silicon carbide and and excess carbon, is obtained by means of heat-treating the porous silicon dioxide-carbon molding at a temperature from 1600° C. to 2500° C. Then, the porous silicon carbide molding becomes a solid joined body by means of impregnating with molten metallic silicon, thereby reacting excess carbon with silicon at the joining plane, so as to become silicon carbide.

According to the above-mentioned method, a joined body without an interface is obtained. However, in the case of a relatively large-sized joined body, the difference in carbon concentration between the surface and the inside of the body occurs, and homogeneous deposition of carbon may be not achieved during the depositing operation of carbon produced from hydrocarbon gas or hydrocarbon halide gas. Then, a method comprising depositing carbon on the porous synthesized silica glass body before, joining the porous silicon dioxide-carbon molding at the joining plane, heat-treating the same, and charging with metallic silicon is effective in order to obtain the relatively large-sized products.

Also, the porous silicon carbide molding comes to solid joined body by means of depositing carbon in the the porous synthesized silica glass body before, heat-treating the same, joining the porous silicon carbide molding at the plane to join, and charging with silicon.

According to the above-mentioned method, the joining part comes to have the same formation with the silicon carbide base material part, and the high junction strength is achieved at high temperature as well as at room temperature because the difference in thermal expansion coefficients of the base material and the joining part are almost nothing, unlike a usual junction by only metallic silicon.

Then, we refer to a process for producing a silicon dioxide-carbon complex and a silicon dioxide-silicon carbide complex.

As previously described, a vapor phase synthesis technique named generically the Soot method which includes the MCVD (Modified Chemical Vapor Deposition) method, the OVD (Outside Vapor Deposition) method, the VAD (Vapor-phase Axial Deposition) method etc. has been developed, and made practicable to produce optical fiber.

A process for producing a porous silica glass body by means of vapor phase synthesis comprises the steps of: vaporizing silicon chloride such as silicon tetrachloride, hydrolyzing as in the following formula (2) under oxidizing atmosphere such as in a flame, or oxidizing as in the following formula (3), so as to obtain a silicon dioxide particle, and sedimentating the silicon dioxide particle.

$$SiCl_4 + 2H_2O \rightarrow SiO_2 + 4HCl \qquad (2)$$

$$SiCl_4 + O_2 \rightarrow SiO_2 + 2Cl_2 \qquad (3)$$

The porous synthesized silica porous body produced by means of the above vapor phase synthesis is known to avoid being contaminated by metallic impurities which are formed by corrosion of a container, because halogen gas such as HCl, $Cl_2$ is separated from the particle during the step of sedimentation of the silicon dioxide particles, and thus has extremely high purity with 1 ppm or less of metallic elements impurity.

Since carbon is deposited homogeneously on the porous synthesized silica glass body by means of heat treating the porous body under an atmosphere comprising a high purity hydrocarbon gas or hydrocarbon halide gas, it is possible to be densified by viscous flow of the synthesized silica glass by means of heat-treating the above porous silicon dioxide-carbon complex having mole ratio of carbon to silicon oxide of 1 or less at a temperature of from 1200° C. to 1600° C. In addition, an extremely high purity and dense silicon dioxide-carbon complex can be synthesized in the case of a high purity starting material, and without the steps of mixing and molding, Also, it is possible to produce silicon carbide from deposited carbon and the synthesized silica glass, and to densify the synthesized silica glass by means of heat-treating the above porous silicon dioxide-carbon complex having a mole ratio of carbon to silicon dioxide of 1 or less at a temperature of more than 1600° C. In addition, the extremely high purity and dense silicon dioxide-silicon carbide complex can be synthesized in the case of a high purity starting material, and without the steps of mixing and molding.

When the extremely high purity porous synthesized silica glass body is used as silicon dioxide in the vapor phase synthesis as shown in formula (1), a porous silicon dioxide-carbon body, which is similar to microscopic mixture of silicon dioxide and carbon, is obtained by the steps of heat-treating of the porous body under an atmosphere comprising a hydrocarbon gas or a hydrocarbon halide gas, and depositing carbon homogeneously over the inside of the porous body. Provided that the porous silicon dioxide-carbon body having a mole ratio of carbon to silicon dioxide of 1 or less is heat-treated at 1200° C. or more, the silicon dioxide-carbon complex material is promoted to be densified by viscous sintering. On the other hand, provided that the porous silicon dioxide-carbon body is heat-treated at a temperature of less than 1600° C., a dense silicon dioxide-carbon complex is obtained because carbon does not react with silica glass. Also, on the condition that the porous silicon dioxide-carbon body has a mole ratio of carbon to silicon dioxide, of 1 or more a dense silicon dioxide-carbon complex is not obtained because the carbon covering the silica glass inhibits heat treatment due to viscous flow of silica glass.

Further, in the case of sintering a porous silicon dioxide-carbon body having a mole ratio of carbon to silicon dioxide of 1 or less, it is recognized that the standard free energy ($\Delta G$) in formula (1) becomes a negative value at 1600° C. or more, as the result of thermodynamic calculation illustrated in FIG. 1, and a part of the synthesized silica glass becomes silicon carbide. On condition that porous silicon dioxide-carbon body has a mole ratio of carbon to silicon dioxide of 1 or more, the synthesized silica glass becomes mostly silicon carbide, and a dense silicon dioxide-silicon carbide complex cannot be obtained because it is difficult to sinter silicon carbide. Therefore, it is necessary to regulate the mole ratio of carbon to silicon dioxide in the porous synthesized silica glass body with deposited carbon to be 1 or less. Moreover, in the condition that the heat-treating temperature is 2000° C. or more, a dense silicon dioxide-silicon carbide complex can not be effectively obtained even though the porous body has mole ratio of carbon to silicon dioxide of 1 or less because vaporization of silicon oxide is promoted as showing formula (4):

$$SiO_2 + C \rightarrow SiO + CO \qquad (4)$$

Then, we refer to a process for producing a silicon carbide powder, the process comprising the steps of depositing carbon produced by means of pyrolysis of a hydrocarbon gas or a hydrocarbon halide gas into a porous synthesized silica glass body, heat-treating the same at a temperature of from 1600° C. to 2500° C. As a result, the content of impurities such as transition metals, amphoteric metals, alkali metals, alkali earth metals is 10 ppm or less, and a high purity $\beta$-type silicon carbide which has 0.01~10 $\mu$m average particle diameter, 10~70 $m^2/g$ specific surface area and a good degree of sintering can be obtained in a good yield without the step of milling the powder.

The synthesized silica glass produced by the Soot method is composed of silicon carbide particle of 0.01~10 $\mu$m average particle diameter, and has 40~80% porosity and high purity with 1 ppm or less of impurities content. Also, the synthesized silica glass is not contaminated during the steps of production because it is conducted without the steps of mixing with binder and molding such as pressing.

Further, according to this invention, the synthesized silica glass is heat-treated under an atmosphere comprising at least one gases among hydrocarbon gases such as $CH_4$, $C_2H_6$, $C_3H_8$, $C_4H_{10}$, $C_2H_4$, $C_2H_2$, $C_6H_6$, and hydrocarbon halide gases such as $CH_3Cl$, $CH_2Cl_2$, $CHCl_3$, $C_2H_4Cl_2$, $C_2H_3Cl_3$, $C_2H_3Cl$, $C_2H_2Cl_2$, $C_2HCl$, $C_6H_5Cl$, at a temperature from decomposition temperature of the gas used to 1400° C. If the temperature is less than the decomposition temperature of the gas used, carbon cannot be deposited, and if the temperature is more than 1400° C., carbon cannot be deposited over the inside because of the body becoming a dense porous body at a temperature of 1400° C. or more.

In addition, it is necessary to regulate the mole ratio of carbon to silicon dioxide in base material from 1 to 3. Because the reaction of silicon dioxide with carbon is performed as follows (1):

$$SiO_2 + 3C \rightarrow SiC + 2CO \qquad (1)$$

and carbon deposition with a mole ratio of carbon to silicon dioxide of more than 3 allows excess free carbon to be present. In case of existing excess free carbon, silicon carbide produced by means of the carbon reduction of porous synthesized silica glass does not become powder, but rather becomes a porous body. Therefore, the step of milling the powder in order to obtain powder-shaped silicon carbide causes contamination of the powder.

On the other hand, in case that the mole ratio of carbon to silicon dioxide is less than 1, silicon dioxide particles fuse during the step of raising the temperature for heat-treatment since carbon does not cover the surface of the silicon dioxide particle sufficiently. As a result, the silicon dioxide particles becomes large and dense, and it inhibits desorption of CO gas.

In addition, because of vaporizing excess silicon oxide, the yield of produced material is lowered at a range of high temperature.

Therefore, it is necessary to regulate mole ratio of carbon to silicon dioxide from 1 to 3, preferably from 2.5 to 3.

In next step, the synthesized silica glass-carbon complex is heat-treated at a temperature of from 1600° C. to 2500° C. under a non-oxidizing atmosphere, for example, an atmosphere comprising at least one gas among helium, neon, argon, hydrogen, etc., or under a vacuum. As a consequence, the super fine particles of silicon dioxide are reduced extremely rapidly by the super fine particles of pyrolytic carbon, and completely become silicon carbide.

The pyrolytic carbon, as described above, is a fine particle in several ten nm, and is deposited on surface of the silicon dioxide particles homogeneously. As a result, the silicon dioxide particle does not grow, and fine silicon carbide particles are obtained. Also, produced CO gas is easily excluded to outside of system because the synthesized silica glass-carbon complex is porous.

On this occasion, if the heat-treating temperature is less than 1600° C., silicon dioxide is not produced, and thus the heat-treating temperature is preferably not more than 2500° C. in terms of energy and the cost of device.

According to the above-mentioned method, a β-type silicon carbide powder is mainly obtained. There are several crystal of silicon carbide such as 2H-type silicon carbide which is stable at a lower temperature than β-type silicon carbide, 4H- α-type and 6H- α-type silicon carbide which is stable at a higher temperature than β-type silicon carbide. The 2H-type silicon carbide is unstable in the range of usual heat-treating, and causes unusual glowing particles during heat-treating operations. The existence of 4H and 6H- α-type silicon carbide in β-type silicon carbide promotes phase transformation from β to α during heat-treating, and it forms plate-shaped rough α-type silicon carbide. As a result, it is difficult to obtain a heat-treating body, which is of high density, homogeneous and high strength. Therefore, it is preferable to provide β-type silicon carbide.

DESCRIPTION OF PREFERRED EMBODIMENTS

The invention will be understood more readily with reference to the following examples. However these examples are intended to illustrate the invention and are not to be construed to limit the scope of the invention.

EXAMPLE 1

In the following example, a porous synthesized silica glass body, which was produced by means of the Soot method, and which had about 0.3 g/cm³ apparent density, about 12 m²/g specific surface area, about 0.2 μm average particle diameter, was used. The porous synthesized silica glass body was heat-treated at a temperature of from 500° C. to 1500° C. under an atmosphere of 100% $CH_4$ for 1 hour.

The results are shown in Table 1.

TABLE 1

| | condition of operation | | | existence of carbon deposit over inside porous body |
|---|---|---|---|---|
| | atmosphere | time | temp. | |
| deposit operation of carbon | $CH_4$ 100% | 1 hr | 500° C. | x |
| | | | 600° C. | o |
| | | | 800° C. | o |
| | | | 1200° C. | o |
| | | | 1400° C. | o |
| | | | 1500° C. | x |

| | condition of operation | | | existence of SiC peak by X-ray diffracting |
|---|---|---|---|---|
| | atmosphere | time | temp. | |
| heat-treating operation | under reduced pressure | 3 hr | 1500° C. | x |
| | | | 1600° C. | o |
| | | | 1700° C. | o |
| | | | 1800° C. | o |
| | | | 2000° C. | o |

These data, listed in Table 1, indicate that the silicon dioxide-carbon complex, in which carbon covers the silica glass particles, was obtained by depositing carbon over the inside of the porous body at a temperature of from 600° C. to 1400° C., which is the decomposition temperature of $CH_4$ gas. On the other hand, pyrolysis did not occur at 500° C., and at 1500° C., carbon was deposited only on the surface of the porous body because the synthesized silica glass was promoted to be densified during the step of rising up to 1500° C. In the case of heat-treating at a temperature of 1000° C., the mole ratio of carbon to silicon dioxide was 3.5.

The silicon dioxide-carbon complex, which was treated at a temperature of 1000° C. in a similar manner as above, was then heat-treated at a temperature from 1500° C. to 2000° C. under reduced pressure for 3 hours. The results are shown in Table 1.

Figure 2:
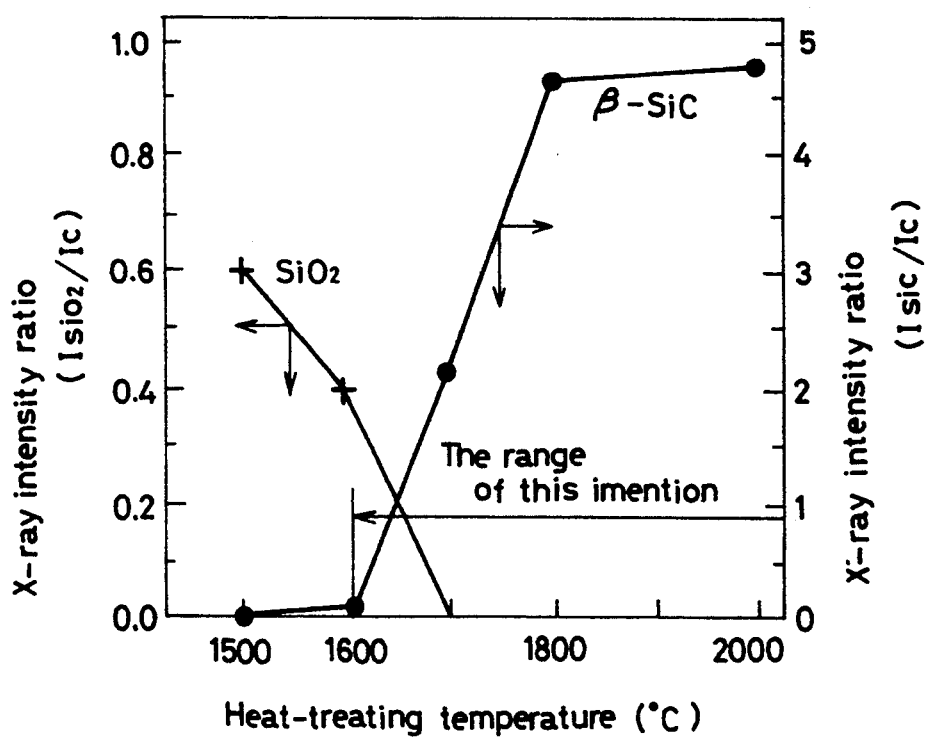
FIG. 2 is a graph showing the relationship between the heat-treating temperature and the range in which the silicon carbide forms.

These data, listed in Table 1, indicate that the formation of β-type silicon carbide was confirmed in examples subjected to a heat-treating temperature of 1600° C. or more, by X-ray diffraction as is set forth in Table 1 and FIG. 2.

The porous silicon carbide, which was contaminated with 1 ppm metallic elements, was extremely high purity silicon carbide.

Therefore, according to this invention, an extremely high purity silicon dioxide-carbon complex can be produced without contaminants from the reactor, the jig, and the atmosphere because carbon produced by means of vapor pyrolysis is deposited in the high purity porous synthesized silica glass. In addition, the extremely high purity silicon carbide can be produced by means of heat-treating the high purity silicon dioxide-carbon complex.

EXAMPLE 2

In the following example, a porous synthesized silica glass body, which was produced by means of the Soot method, and which had about 0.3 g/cm$^3$ apparent density, about 12 m$^2$/g specific surface area, and 0.2 μm average particle diameter, was heat-treated for 4 hours at a temperature of 1000° C. under an atmosphere of 100% CH$_4$. A porous synthesized silica glass body-carbon complex having a mole ratio of carbon to silicon dioxide of about 8.5 was obtained.

Then, a porous silicon carbide-carbon complex having about 46% porosity and a mole ratio of carbon to silicon dioxide of about 5.5 was obtained by means of heat-treating the above complex for 3 hours at a temperature of 2000° C. under a vacuum.

Then, the thus obtained porous body was placed in graphite crucible covered by silicon carbide, 10N in purity massive metallic silicon was placed in the crucible along the porous compact, and both were heated at 1600° C. As a result, molten silicon infiltrated into the pores of the porous molding.

The density and bending strength of the silicon carbide material produced by the above-mentioned method are shown in Table 2, and the concentration of metallic impurities are shown Table 3.

TABLE 2

|  | apparent density (g/cm$^3$) | apparent porosity (vol %) | bending strength (Kgf/mm$^2$) |
|---|---|---|---|
| EXAMPLE 2 | 2.81 | 0.10 | 42.4 |

TABLE 3

|  | Ca | K | Al | Fe | Mg | Mn (ppm) | Cu |
|---|---|---|---|---|---|---|---|
| EXAMPLE 2 | <1 | <1 | <1 | <1 | <1 | <1 | <1 |
| COMPARATIVE EXAMPLE 1 | 5 | <1 | 12 | <1 | <1 | <1 | <1 |

COMPARATIVE EXAMPLE 1

A silicon carbide material used for producing for a semiconductor was produced by means of usual method. The impurities are shown in Table 3 along with EXAMPLE 2.

EXAMPLE 3

In the following example, a porous synthesized silica glass body, which was produced by means of the Soot method, and which had about 0.5 g/cm$^3$ apparent density, about 10 m$^2$/g specific surface area, and 0.2 μm average particle diameter, was heat-treated for 4 hours at a temperature of 900° C. under an atmosphere of 100% CH$_4$. A porous synthesized silica glass body-carbon complex having a mole ratio of carbon to silicon dioxide of about 6.5 was obtained.

Then, the thus obtained complex was sintered for 3 hours at a temperature of 1800° C. under a vacuum. The silicon carbide-carbon complex (porous compact), having about 0.9 g/cm$^3$ apparent density, about 32% porosity and a mole ratio of carbon to silicon dioxide of about 3.5, was obtained.

Then, the thus obtained porous molding was heat-treated in an electric reactor having silica glass-made reactor tube under an atmosphere of 10 vol % SiHCl$_3$ gas and 90 vol % H$_2$ gas at a temperature of 1000° C., whereby excess carbon in the porous molding was allowed to react with deposited silicon. As a result, a dense silicon carbide in which silicon had infiltrated was obtained.

The density and bending strength of the silicon carbide material produced by the above-mentioned method are shown in Table 4, and the concentration of metallic impurities are shown Table 5.

According to the process for producing the silicon carbide material, a silicon carbide material which had 2.97 g/cm$^3$ apparent density, 0.82 vol % apparent porosity, a high strength such as 48.2 Kgf/mm$^2$ average bending strength, and a high purity such as less than 1 ppm impurities, was obtained.

COMPARATIVE EXAMPLE 2

A silicon carbide material was produced from silicon carbide powder by means of mixing silicon carbide powder with an organic binder, molding, heat-treating, and then impregnating to the porous silicon carbide body with molten silicon. The density and bending strength of this silicon carbide material produced by the above-mentioned method are shown in Table 4, and the concentration of metallic impurities are shown Table 5. According to this method, a silicon carbide, which had 3.02 g/cm$^3$ apparent density, 0.31 vol % apparent porosity, a comparatively low strength such as 24.8 Kgf/mm$^2$ average bending strength, and which contained a lot of impurities, was obtained.

TABLE 4

|  | apparent density (g/cm$^3$) | apparent porosity (vol %) | bending strength (Kgf/mm$^2$) |
|---|---|---|---|
| EXAMPLE 3 | 2.97 | 0.82 | 48.2 |
| COMPARATIVE EXAMPLE 2 | 3.02 | 0.31 | 24.8 |

TABLE 5

|  | Ca | Cr | Al | Fe | Mg | Ni (ppm) | Cu |
|---|---|---|---|---|---|---|---|
| EXAMPLE 3 | <1 | <1 | <1 | <1 | <1 | <1 | <1 |
| COMPARATIVE EXAMPLE 2 | 60 | 7 | 26 | 61 | 5 | 7 | 10 |

Therefore, according to this invention, the high purity and the high strength silicon carbide, which is useful as, for example, a jig for producing semiconductors, a heat resistant jig material such as process tube, a wafer boat used for heat doping operations, can be produced.

EXAMPLE 4

In the following example, a silica glass particle which had about 0.3 g/cm$^3$ apparent density, about 12 m$^2$/g specific surface area, about 0.2 μm average particle diameter, was deposited on the external surface of a high purity synthesized silica glass pipe having an external diameter of 190 mm by means of the OVD method. Then, the pipe-shaped porous synthesized silica glass body with deposited porous silica glass body was heat-treated at a temperature of from 500° C. to 1500° C. under an atmosphere of 100% CH$_4$ for 4 hour. The results are shown in Table 6. These data, listed in Table 6, indicate that the pipe-shaped silicon dioxide-carbon complex, in which the silica glass particles were covered by carbon, was obtained by means of heat-treating at a temperature of from 600° C. to 1400° C., and carbon was deposited over the inside of the porous synthesized silica glass body.

On the other hand, pyrolysis did not occur at 500° C., and carbon was deposited on only surface of the porous body because the synthesized silica glass was promoted to be densified during the step of raising the temperature up to 1500° C.

In the case of heat-treating at a temperature of 1000° C., the mole ratio of carbon to silicon dioxide was 8.5.

Figure 3:
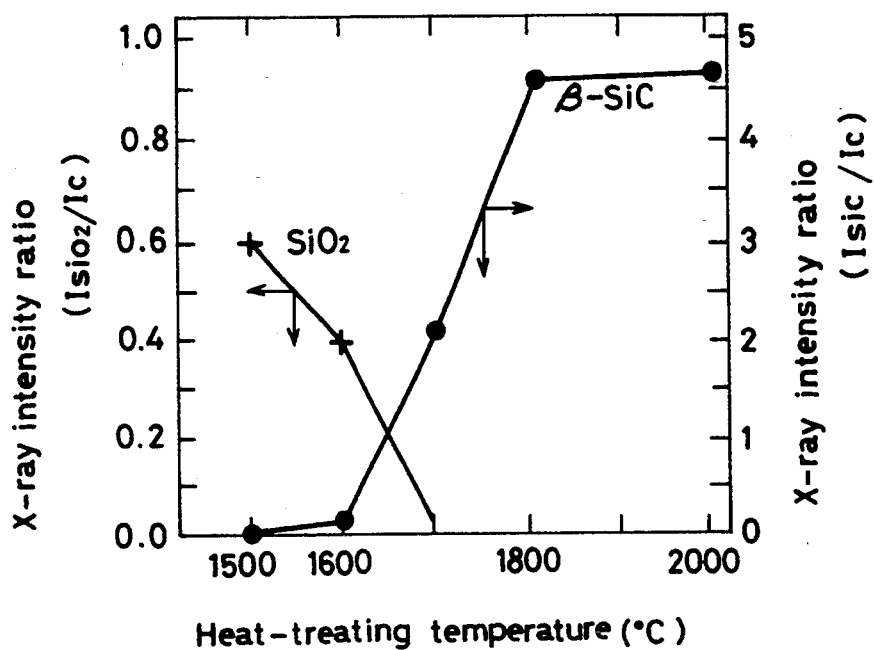
FIG. 3 is a graph showing the relationship between the heat-treating temperature and the range in which the silicon carbide forms.

Then, the pipe-shaped silicon dioxide-carbon complex, which was treated at a temperature of 1000° C. in a similar manner as above, was heat-treated at a temperature of from 1500° C. to 2000° C. under reduced pressure for 3 hours. As a result, the formation of $\beta$-type silicon carbide was confirmed at a heat-treating temperature of 1600° C. or more from the X-ray diffraction set forth in FIG. 3.

The porous silicon carbide pipe, which included 1 ppm or less impurities, had extremely high purity silicon carbide material.

The thus obtained pipe-shaped silicon dioxide-carbon complex was heat-treated under reduced pressure at a temperature of 2000° C. for 3 hours. As a result, the silica glass used for a base material was eliminated, the porous silicon carbide pipe comprising excess carbon, which had about 0.3 g/cm$^3$ apparent density, about 46% porosity, and a mole ratio of carbon to silicon dioxide of about 5.5 was obtained.

Then, the thus obtained porous silicon carbide pipe was dipped into molten silicon in graphite crucible covered by silicon carbide under reduced pressure and at a temperature of 1600° C. As a result, the molten silicon infiltrated into the pores of the porous body, and a dense silicon carbide pipe could be obtained.

EXAMPLE 5

In the following example, a porous silica glass body, which had about 0.3 g/cm$^3$ apparent density, about 12m$^2$/g specific surface area, about 0.2 $\mu$m average particle diameter, was deposited on the external surface of the high purity synthesized silica glass pipe, having an external diameter of 190 mm and produced by means of the OVD method. Then, the thus obtained pipe-shaped porous synthesized silica glass body was heat-treated at a temperature of 1000° C. under an atmosphere of 40% CH$_4$ and 60% argon for 30 minutes. As a result, carbon was deposited over the inside of the pipe-shaped porous synthesized silica glass body, and a pipe-shaped silicon dioxide-carbon complex, which had a mole ratio of carbon to silicon dioxide of 5.5, was obtained.

The thus obtained pipe-shaped silicon dioxide-carbon complex was sintered at a temperature of from 1500° C. to 2000° C. The results, as listed in Table 7, indicate that silicon carbide was not produced at a temperature of 1500° C., and at a temperature of more than 2000° C., the dense silicon carbide pipe could not be obtained because of bubble formation remarkably due to SiO, a volatile product of silica glass.

The pipe-shaped silicon dioxide-carbon complex was heat-treated at a temperature of 1800° C. under reduced pressure for 3 hours an became dense practically dense. The deformation of the internal diameter of the pipe-shaped silicon dioxide-carbon complex, which had 190 mm internal diameter, 6 mm thickness and 20 mm length after heat treatment at a temperature of 1200° C. for 24 hours, was 1 mm or less.

TABLE 6

| | condition of operation | | | existence of carbon deposit over inside porous body |
|---|---|---|---|---|
| | atmosphere | time | temp. | |
| deposit operation of carbon | CH$_4$ 100% | 4 hr | 500° C. | x |
| | | | 600° C. | o |
| | | | 800° C. | o |
| | | | 1000° C. | o |
| | | | 1200° C. | o |
| | | | 1400° C. | o |
| | | | 1500° C. | x |

TABLE 7

| | condition of operation | | | forming SiC | volatilization of SiO$_2$ |
|---|---|---|---|---|---|
| C/SiO$_2$ | atmosphere | time | temp. | | |
| 0.5 | under reduced pressure | 3 hr | 1500° C. | x | x |
| | | | 1600° C. | o | x |
| | | | 1800° C. | o | x |
| | | | 2000° C. | o | x |
| | | | 2200° C. | o | o |

According to this process for producing a silicon carbide tube, an extremely high purity pipe-shaped porous silicon carbide can be obtained because the silicon carbide is synthesized by means of carbothermic reduction with the high purity pipe-shaped porous body synthesized from silica glass and vapor phase pyrolytic carbon, and infiltrating silicon to this pipe-shaped porous silicon carbide.

Also, a high purity dense silicon dioxide-carbon complex tube can be obtained by means of heat-treating so that the mole ratio of carbon to silicon dioxide is 1 or less.

Therefore, the high purity and the high strength silicon carbide tube, which is useful as a jig for producing semiconductors, for example, as a heat resistance jig material such as process tube, wafer boat used for heat doping operations, can be produced with a single process and at a low cost.

EXAMPLE 6

In the following example, a porous synthesized silica glass body, which was produced by means of the Soot method and which had about 0.3 g/cm$^3$ apparent density, and about 0.2 $\mu$m average particle diameter, was joined at a plane. Then, the porous synthesized silica glass body was heat treated at a temperature of 1000° C., under an atmosphere of 100% CH$_4$ for stated hours. As a result, the porous body, which had various carbon contents, as listed in Table 8, was obtained. Then, a porous silicon carbide-carbon molding was obtained by means of heat-treating the porous body at a temperature of 2000° C. under a vacuum for 3 hours. Then, the molding was placed in graphite crucible, 10N impurity massive metallic silicon was put in the crucible along the molding, and the both were heated at 1550° C. As a result, molten silicon infiltrated into the pores of the molding and a silicon carbide molding was obtained.

EXAMPLE 7

A silicon dioxide-carbon porous molding, which was produced by means of heat-treating the same type of porous synthesized silica glass body that was used in EXAMPLE 6 for stated hours at a temperature of 1000° C. and under an atmosphere of 100% CH$_4$, was joined at a plane. Then, the thus obtained molding was heat-treated for 3 hours at a temperature of 2000° C. under a vacuum. As a result, a porous silicon carbide-carbon molding was obtained. Then, a silicon carbide molding was obtained by means of infiltrating with molten silicon in the same manner as in EXAMPLE 6.

EXAMPLE 8

A porous silicon dioxide-carbon molding, which was produced by means of heat-treating the same type of porous synthesized silica glass body that was used in EXAMPLE 6 for stated hours at a temperature of 1000° C. and under an atmosphere of 100% $CH_4$, was obtained. Then, the molding was heat-treated for 3 hours at a temperature of 2000° C. under a vacuum to obtain a porous silicon carbide-carbon molding. Then, the thus obtained molding was joined at a plane. A silicon carbide molding was obtained by means of infiltrating with molten silicon the same manner as in EXAMPLE 6.

COMPARATIVE EXAMPLE 3

A molding was produced by means of joining a dense body, which was silicon carbide heat-treating body produced from metallic silicon.

COMPARATIVE EXAMPLE 4

A molding was produced by forming a porous silicon carbide body by means of molding a silicon carbide powder and heat-treating, and then infiltrating metallic silicon after applying carbon at the plane.

The high temperature junction strength at 1300° C. of the silicon carbide molding produced in the above-mentioned examples are shown in Table 8, and the results of purity analysis are shown in Table 9.

TABLE 8

| No | condition at joining operation | C/SiO$_2$ | junction type | junction strength |
|---|---|---|---|---|
| 1 | porous silica glass body + porous silica glass body | 3 | Si junction | 12 |
| 2* | porous silica glass body + porous silica glass body | 4 | SiC junction | 31 |
| 3* | porous silica glass body + porous silica glass body | 8 | SiC junction | 43 |
| 4* | porous silica glass-C body + porous silica glass-C body | 8 | SiC junction | 40 |
| 5* | porous SiC-C body + porous SiC-C body | 8 | SiC junction | 38 |
| 6 | dense SiC body + dense SiC body | — | Si junction | 11 |
| 7 | porous SiC body + porous SiC body | Δ1 | SiC junction | 18 |

Δ1: applying carbon at a composition plane.

TABLE 9

| | Ca | K | Al | Fe | Mg | Mn | Cu |
|---|---|---|---|---|---|---|---|
| *SAMPLE NO. 3 | <1 | <1 | <1 | <1 | <1 | <1 | <1 |
| SAMPLE NO. 7 | 32 | 8 | 20 | 5 | 2 | <1 | <1 |

(ppm)

In the above, sample Nos. 2 to 5 marked "*" show examples of this invention, and sample Nos. 1, 6, 7 show examples outside this invention.

These data, listed in Table 8 and Table 9, indicate that the high purity silicon carbide compact according to this invention shows higher strength than a usual silicon junction body. Also, a wafer boat produced from this high purity silicon carbide molding is suitable for use in wafer heat treatment in terms of purity, strength and durability.

On the other hand, the junction strength joint between the dense silicon carbide body is lower than that of the base material. Also, in case of infiltrating metallic silicon after applying carbon at a composition plane, the junction strength is low due to heterogeneity of the junction and the base material, contamination of impurities from carbon applied and from the step of application are recognized.

According to the process for producing the jointed silicon carbide molding, the high strength junction body, which is an integral construction without an interface, a large-sized complex can be obtained. In case of producing a comparatively large-sized compact, the high strength junction body can be obtained because the carbon, produced by means of pyrolysis of the hydrocarbon gas or the hydrocarbon halide gas, is deposited homogeneously without exhibiting a difference of carbon deposition from surface to inside. Therefore, the high purity and the high strength silicon carbide tube, which is useful as a jig producing for semiconductor, for example, as a heat resistant jig material such as process tube, and as a wafer boat used for heat doping operations, can be produced with a single process and at a low cost.

According to this invention, since the process comprises the steps of joining porous synthesized silica glass body at a joining plane, depositing carbon produced by means of pyrolysis of a gas comprising a hydrocarbon or a hydrocarbon halide in said porous body and said plane so as to have a mole ratio of carbon to silicon dioxide of 3.5 or more, heat-treating the same to obtain a porous silicon carbide molding, a charging said porous silicon carbide molding with metallic silicon, a high strength junction body, which is of integral construction without interface, and a large-sized complex can be obtained.

Moreover, according to this invention, since the process comprises the steps of depositing carbon produced by means of pyrolysis of a gas comprising a hydrocarbon or a hydrocarbon halide in a porous synthesized silica glass body so as to have a mole ratio of carbon to silicon dioxide to obtain porous silicon dioxide-carbon molding, joining said porous molding at the plane to join, heat-treating the same to obtain porous silicon carbide molding, and charging said porous silicon carbide molding with metallic silicon, in case of producing large-sized molding, a high strength junction body can be obtained because carbon, produced by means of pyrolysis of the hydrocarbon gas or the hydrocarbon halide gas, is deposited homogeneously while inhibiting a difference of carbon deposition from the surface to the inside.

Also, according to this invention, since the process comprises the steps of depositing carbon produced by means of pyrolysis of the gas comprising a hydrocarbon or a hydrocarbon halide in a porous synthesized silica glass body so as to have a mole ratio of carbon to silicon dioxide of 3.5 or more, heat-treating the same to obtain porous silicon carbide molding, joining said porous silicon carbide molding at the plane to join, and charging the same with metallic silicon, even in case of producing large-sized molding, a high strength junction body can be obtained because carbon, produced by means of pyrolysis of the hydrocarbon gas or the hydrocarbon halide gas, is deposited homogeneously with inhibiting a difference of carbon deposition from the surface to the inside.

Therefore, the high purity and the high strength joined silicon carbide molding, which is useful as a jig for producing semiconductor, for example, heat as a resistant jig material such as process tube, as a wafer boat used for heat doping operations, can be produced with a single process and at a low cost.

EXAMPLE 9

In the following example, a porous synthesized silica glass body, which was produced by means of the Soot method, and had about 0.3 g/cm$^3$ apparent density, about 12 m$^2$/g specific surface area, and 0.2 μm average particle diameter, was heat-treated for 30 minutes at a temperature of 1000° C. and under an atmosphere of various concentrations (diluting with Ar gas) of CH$_4$ gas. As a result, carbon was deposited over the inside of the porous synthesized silica glass body, and a the porous silicon dioxide-carbon body, in which silica glass particles were covered by carbon, was obtained. Then, the porous silicon dioxide-carbon body, which had the mole ratio of carbon to silicon dioxide as listed in Table 10, was obtained.

The thus obtained porous silicon dioxide-carbon body was heat-treated under a vacuum at a temperature of 1500° C. for 3 hours. As listed in Table 10, when the porous silicon dioxide-carbon body had a mole ratio of carbon to silicon dioxide of 1 or less, a dense silicon dioxide-carbon complex was obtained because of densification of the porous silicon dioxide-carbon body due to viscous sintering of silica glass. By contrast, when the porous silicon dioxide-carbon body had a mole ratio of carbon to silicon dioxide of 1 or more, the dense silicon dioxide-carbon complex material was not obtained because the carbon covering the silica glass exhibits sintering by viscous flow of silica glass.

Also, if the porous silicon dioxide-carbon body, which had a mole ratio of carbon to silicon dioxide of 1 or less was heat-treated at a temperature of 2000° C., as listed in Table 10, a dense silicon dioxide-silicon carbide complex was obtained because part of the synthesized silica glass became silicon carbide. Then, when the porous silicon dioxide-carbon body had mole ratio of carbon to silicon dioxide of more than 1, almost all of synthesized silica glass became silicon carbide. As a result, the dense silicon dioxide-silicon carbide complex was not obtained because the silicon carbide is difficult to heat-treat. Therefore, it is necessary that the mole ratio of carbon in the porous synthesized silica glass body be 1 or less at a heat-treating temperature of 2000° C.

TABLE 10

| C/SiO$_2$ | heat-treating condition | becoming dense |
| --- | --- | --- |
| 0 | 1500° C. × 3 hr. | o |
| 0.5 | | o |
| 1.0 | | o |
| 2.0 | | x |
| 0 | 2000° C. × 3 hr. | o |
| 0.5 | | o |
| 1.0 | | o |
| 2.0 | | x |

Also, a porous synthesized silica glass body, which was produced by means of the Soot method, and which had about 0.3 g/cm$^3$ apparent density, about 12 m$^2$/g specific surface area, and 0.2 μm average particle diameter, was heat-treated for 30 minutes at a temperature of 1000° C. under an atmosphere of 40% CH$_4$(diluting with Ar gas). As a result, carbon was deposited over the inside of the porous synthesized silica glass body and a porous silicon dioxide-carbon body, in which silica glass particles were covered by carbon, was obtained. Then, the porous silicon dioxide-carbon body had a mole ratio of carbon to silicon dioxide of 0.5.

The thus obtained porous silicon dioxide-carbon body was heat-treated under a vacuum at a temperature of from 1100° C. to 1600° C. for 3 hours. As listed in Table 11, when the porous silicon dioxide-carbon body was heat-treated at a temperature of from 1200° C. to 1600° C., a dense silicon dioxide-carbon complex was obtained because of densification of the porous silicon dioxide-carbon body.

Particularly, when the porous silicon dioxide-carbon body was heat-treated at a temperature 1500° C., densification was complete, the silicon dioxide-carbon complex a temperature of deformation ( the temperature of becoming viscosity coefficient of 10$^{14.5}$ poise) of about 1100° C. and, had higher heat resistance than a usual silica glass.

Also, this silicon dioxide-carbon complex, comprising 1 ppm of metallic element impurity, had extremely high purity.

TABLE 11

| C/SiO$_2$ | treating temperature | heat-being dense | composition | volatilization |
| --- | --- | --- | --- | --- |
| 0.5 | 1100° C. | x | C + | x |
| 0.5 | 1200° C. | o | SiO$_2$ C + | x |
| 0.5 | 1300° C. | o | SiO$_2$ C + | x |
| 0.5 | 1400° C. | o | SiO$_2$ C + | x |
| 0.5 | 1500° C. | o | SiO$_2$ C + | x |
| 0.5 | 1600° C. | o | SiO$_2$ | x |
| 0.5 | 1800° C. | o | SiC + C + SiO$_2$ | x |
| 0.5 | 2000° C. | o | SiC + | x |
| 0.5 | 2200° C. | — | SiO$_2$ SiC + SiO$_2$ | o |

A porous silicon dioxide-carbon body produced in the manner as described in the above example was heat-treated under a vacuum at a temperature of from 1500° C. to 2200° C. for 3 hours. As listed in Table 11, when the porous silicon dioxide-carbon body was heat-treated at a temperature of from 1600° C. to 2000° C., a dense silicon dioxide-carbon complex was obtained because of the formation of β-type silicon carbide. Particularly, when the porous silicon dioxide-carbon body was heat-treated at a temperature 1800° C., the silicon dioxide-carbon complex had a temperature of deformation (the temperature of becoming viscosity coefficient of 10$^{14.5}$ poise) of 1200° C. and had higher heat resistance than a usual silica glass.

Also, this silicon dioxide-silicon carbide complex, comprising 1 ppm of metallic element impurity, had extremely high purity.

Therefore, according to the process for producing the silicon dioxide-carbon complex or a silicon dioxide silicon carbide complex, since the process comprises the steps of depositing carbon produced by means of pyrolysis of a gas comprising a hydrocarbon or a hydrocarbon halide in a porous synthesized silica glass body so as to mole ratio of carbon to silicon dioxide of 1 or less to obtain a porous silicon dioxide-carbon complex, making the same dense by means of heat-treating at a temperature of from 1200° C. to 1600° C., or the steps of depositing carbon produced by means of pyrolysis of the gas comprising a hydrocarbon or a hydrocarbon halide in a porous synthesized silica glass body so as to have a mole ratio of carbon to silicon dioxide to obtain a porous silicon dioxide-carbon complex, generating silicon carbide by means of heat treatment of the same at a temperature of from 1600° C. to 2000° C., it is possible to mix super high purity porous synthesized silica glass with vapor phase pyrolytic carbon microscopically, thereafter being dense due to viscous flow of silica glass, and thereby obtaining a silicon dioxide-carbon complex, the silicon dioxide-silicon carbide complex having a extremely higher purity and a higher heat resistance than silica glass.

Therefore, the dense silicon dioxide-carbon complex and silicon dioxide-silicon carbide complex can be provided as a high heat resistance material for producing semiconductors comparatively at a low cost.

EXAMPLE 10

In the following example, a porous synthesized silica glass body, which was produced by means of the Soot method, and which had about 0.3 g/cm$^3$ apparent density, about 12 m$^2$/g specific surface area, and 0.2 μm average particle diameter, was heat-treated for 1 hour at a temperature of 1000° C. and under an atmosphere of 100% CH$_4$ gas. As a result, a porous synthesized silica glass-carbon complex, which had a mole ratio of carbon to silicon dioxide of about 2.8, was obtained. Then, this complex was heat-treated at a temperature of 2000° C. under a vacuum for 3 hours, as listed in Table 12 and Table 13, thereby obtaining high purity and fine β-type silicon carbide powder.

EXAMPLE 11

In the following example, a porous synthesized silica glass body produced as a same manner in EXAMPLE 10, was heat-treated for 1.5 hours at a temperature of 1000° C. under an atmosphere of 20% CH$_4$ gas and 80% H$_2$ gas. As a result, the porous synthesized silica glass-carbon complex, which had a mole ratio of carbon to silicon dioxide of about 1.2, was obtained. Then, this complex was heat-treated at a temperature of 2000° C. under a vacuum for 3 hours, as listed in Table 12, thereby obtaining comparatively large-sized β-type silicon carbide powder.

COMPARATIVE EXAMPLE 5

In the following example, a porous synthesized silica glass body produced as a same manner in EXAMPLE 10, was heat-treated for 1.5 hour at a temperature of 1000° C. under an atmosphere of 100% CH$_4$ gas. As a result, the porous synthesized silica glass-carbon complex, which had a mole ratio of carbon to silicon dioxide of about 3.7, was obtained. Then, this complex was heat-treated at a temperature of 2000° C. under a vacuum for 3 hours, as listed in Table 12, thereby obtaining massive porous silicon carbide containing carbon as impurity but powdered silicon carbide.

COMPARATIVE EXAMPLE 6

In the following example, a porous synthesized silica glass body produced as a same manner in EXAMPLE 10, was heat-treated for 1 hour at a temperature of 1000° C. under an atmosphere of 20% CH$_4$ gas and 80% H$_2$ gas. As a result, the porous synthesized silica glass-carbon complex, which had a mole ratio of carbon to silicon dioxide of about 0.8, was obtained. Then, this complex was heat-treated at a temperature of 2000° C. under a vacuum for 3 hours, as listed in Table 12, thereby obtaining the large-sized silicon carbide particle. This yield is about 22%, and lower than other examples. The purity of the silicon carbide powder produced by means of vapor phase reaction with SiCl$_4$ and CCl$_4$ are shown in Table 13 as COMPARATIVE EXAMPLE 7.

TABLE 12

| | C/SiO$_2$ | C content (wt %) | configuration and diameter of particle | specific surface area (m$^2$/g) |
|---|---|---|---|---|
| EXAMPLE 10 | 2.8 | 0 | 0.25 μm round particle | 68 |
| EXAMPLE 11 | 1.2 | 0 | 5 μm round particle | 17 |
| COMPARATIVE EXAMPLE 5 | 3.7 | 11.5 | — massive porous body | 32 |
| COMPARATIVE EXAMPLE 6 | 0.8 | 0 | 30 μm indeterminate type | 3.5 |

TABLE 13

| | Na | Ca | Al | Fe | Mg | Mn (ppm) | Cu |
|---|---|---|---|---|---|---|---|
| EXAMPLE 10 | <1 | <1 | <1 | <1 | <1 | <1 | <1 |
| COMPARATIVE EXAMPLE 7 | 10 | 50 | 100 | 200 | 10 | 5 | 5 |

These data as listed in Table 12 and Table 13 indicate that in COMPARATIVE EXAMPLE 5 and COMPARATIVE EXAMPLE 6, the silicon carbides, which do not have a mole ratio of carbon to silicon dioxide from 1 to 3, are massive or large-sized silicon carbide particles. By contrast, in EXAMPLE 10 and EXAMPLE 11, the silicon carbides, which have a mole ratio of carbon to silicon dioxide from 1 to 3, comprises only trace contaminant and are of high purity, and are of fine particle β-type silicon carbide which has 0.01~10 μm an average particle diameter, 10~70 m$^2$/g specific surface area, and a good degree of sintering.

Therefore, according to the above-mentioned method, a high purity β-type silicon carbide having a good degree of sintering can be easily produced in a good yield. In addition, a dense, homogeneous and high strength heat-treating molding can be produced by means of using this β-type silicon carbide.

Consequently, according to this invention, since the process comprises the steps of depositing carbon produced by means of pyrolysis of a gas comprising a hydrocarbon or a hydrocarbon halide in a porous synthesized silica glass body so as to have a mole ratio of carbon to silicon dioxide from 1 to 3, heat-treating the same at a temperature of from 1600° C. to 2500° C., a high purity β-type silicon carbide, which is especially useful for a heat resistant ceramic molding, and which has a good degree of sintering, can be easily produced in a good yield without the step of milling the powder.

What is claimed is:

1. A process for producing a silicon carbide-base complex, comprising the steps of:
    conducting pyrolysis of a gas comprising a hydrocarbon having 1–6 carbon atoms or a hydrocarbon halide having 1–6 carbon atoms to produce carbon and depositing said carbon in a porous synthesized silica glass body, heat-treating the same to obtain a porous molding, and charging pores of said molding with metallic silicon.

2. The process according to claim 1, wherein the mole ratio of carbon deposited in the porous synthesized silica glass body to silicon dioxide is 3 or more.

3. The process according to claim 1 or claim 2, wherein the process further comprises the step of:

reacting excess carbon existing in the porous molding with a charge of metallic silicon.

4. The process according to claim 1 or claim 2, wherein the step of charging pores of the porous molding with metallic silicon is achieved by means of infiltration with molten silicon.

5. The process according to claim 3, wherein the step of charging pores of the porous molding with metallic silicon is achieved by means of infiltration with molten silicon.

6. The process according to claim 1 or claim 2, wherein the step of charging pores of the porous molding with metallic silicon is achieved by means of pyrolysis of a gas including silicon.

7. The process according to claim 3, wherein the step of charging pores of the porous molding with metallic silicon is achieved by means of pyrolysis of a gas including silicon.

8. A process for producing a silicon carbide-base complex, comprising the steps of:

joining a first synthesized silica glass porous body at joining plane to to a second synthesized silica porous body to produce a joined body, conducting pyrolysis of a gas comprising a hydrocarbon having 1–6 carbon atoms or a hydrocarbon halide having 1–6 carbon atoms so as to carbon and depositing said carbon on a porous synthesized silica glass joined body in a mole ratio of carbon to silicon dioxide of 3.5 or more, heat-treating the joined body to produce a silicon carbide molding, and charging said porous silicon carbide molding with metallic silicon.

9. A process for producing a silicon carbide-base complex, comprising the steps of:

conducting pyrolysis of a gas comprising a hydrocarbon having 1–6 carbon atoms or a hydrocarbon halide having 1–6 carbon atoms so as to produce carbon and depositing said carbon in porous synthesized silica glass bodies in a mole ratio of carbon to silicon dioxide of 3.5 or more to obtain a porous silicon dioxide-carbon molding, joining said porous molding at a joining plane to a second porous silicon dioxide-carbon molding to produce a joined molding, heat-treating the the joined molding to obtain a silicon carbide molding, and charging said porous silicon carbide molding with metallic silicon.

10. A process for producing a silicon carbide-base complex, comprising the steps of:

conducting pyrolysis of a gas comprising a hydrocarbon having 1–6 carbon atoms or a hydrocarbon halide having 1–6 carbon atoms so as to produce carbon and depositing said carbon in a porous synthesized silica glass body in a mole ratio of carbon to silicon dioxide of 3.5 or more, heat-treating the the body to obtain a porous silicon carbide molding, joining said porous silicon carbide molding at a joining plane to a second porous silicon carbide molding to produce a joined molding, and charging the joined molding with metallic silicon.

11. A process for producing a silicon carbide tube, comprising the steps of:

forming a porous body of silica glass by means of vapor phase synthesis on a surface of tubular material, conducting pyrolysis of a gas comprising a hydrocarbon having 1–6 carbon atoms or a hydrocarbon halide having 1–6 carbon atoms so as to produce carbon and depositing said carbon in a porous synthesized silica glass body in a mole ratio of carbon to silicon dioxide of 3 or more, heat-treating the body to produce a silicon carbide tube, and charging the porous silicon carbide tube with metallic silicon.

12. A process according to claim 11, wherein the heat-treating is conducted at a temperature from 1600° C. to 2500° C.

* * * * *